United States Patent
Wang et al.

(10) Patent No.: US 12,328,449 B2
(45) Date of Patent: Jun. 10, 2025

(54) SIGNALLING OF AUXILIARY INFORMATION

(71) Applicants: Beijing Bytedance Network Technology Co., Ltd., Beijing (CN); Bytedance Inc., Los Angeles, CA (US)

(72) Inventors: Ye-Kui Wang, San Diego, CA (US); Li Zhang, San Diego, CA (US); Kai Zhang, San Diego, CA (US); Zhipin Deng, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 50 days.

(21) Appl. No.: 18/192,098

(22) Filed: Mar. 29, 2023

(65) Prior Publication Data
US 2023/0239511 A1    Jul. 27, 2023

Related U.S. Application Data

(63) Continuation of application No. PCT/CN2021/121513, filed on Sep. 29, 2021.

(51) Int. Cl.
*H04N 19/70* (2014.01)
*H04N 19/136* (2014.01)
(Continued)

(52) U.S. Cl.
CPC .......... *H04N 19/70* (2014.11); *H04N 19/136* (2014.11); *H04N 19/187* (2014.11); *H04N 19/46* (2014.11); *H04N 19/597* (2014.11)

(58) Field of Classification Search
CPC .... H04N 19/70; H04N 19/136; H04N 19/187; H04N 19/46; H04N 19/597
See application file for complete search history.

(56) References Cited

U.S. PATENT DOCUMENTS

2012/0328004 A1\*  12/2012  Coban .................. H04N 19/61
                                                    375/240.03
2014/0301458 A1    10/2014  Rapaka
(Continued)

FOREIGN PATENT DOCUMENTS

CN    101536527 A    9/2009
CN    105052153 A    11/2015
(Continued)

OTHER PUBLICATIONS

"Series H: Audiovisual and Multimedia Systems Infrastructure of audiovisual services—Coding of moving video High efficiency video coding," Rec. ITU-T H.265 | ISO/IEC 23008-2 (in force edition), Feb. 2018, 692 pages.
(Continued)

*Primary Examiner* — Jae N Noh
(74) *Attorney, Agent, or Firm* — Conley Rose, P.C.

(57) ABSTRACT

Systems, methods and apparatus for encoding, decoding or transcoding digital video are described. One example method of processing video data includes performing a conversion between a video and a bitstream of the video according to a format rule, wherein the format rule specifies that a supplemental enhancement information field included in the bitstream indicates whether the bitstream comprises one or more video layers that represent auxiliary information.

19 Claims, 9 Drawing Sheets

(51) Int. Cl.
  *H04N 19/187* (2014.01)
  *H04N 19/46* (2014.01)
  *H04N 19/597* (2014.01)

(56) References Cited

U.S. PATENT DOCUMENTS

| | | | |
|---|---|---|---|
| 2015/0195571 | A1 | 7/2015 | Boyce |
| 2015/0264404 | A1 | 9/2015 | Hannuksela |
| 2019/0253726 | A1 | 8/2019 | Tabatabai |
| 2022/0321896 | A1* | 10/2022 | Deshpande ............ H04N 19/70 |

FOREIGN PATENT DOCUMENTS

| | | |
|---|---|---|
| CN | 106464910 A | 2/2017 |
| CN | 108702503 A | 10/2018 |
| CN | 111586408 A | 8/2020 |
| EP | 3425915 A1 | 1/2019 |
| JP | 2015508580 A | 3/2015 |
| JP | 2016528801 A | 9/2016 |
| WO | 2015056179 A1 | 4/2015 |
| WO | 2020141258 A1 | 7/2020 |

OTHER PUBLICATIONS

Document: JVET-G1001, Chen, J., et al., "Algorithm description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
"Series H: Audiovisual and Multimedia Systems Infrastructure of audiovisual services—Coding of moving video Versatile video coding," Rec. ITU-T H.266 | ISO/IEC 23090-3, Aug. 2020, 516 pages.
Document: JVET-S2001-vH, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, 22 Jun.-Jul. 1, 2020, 548 pages.
"Series H: Audiovisual and Multimedia Systems Infrastructure of audiovisual services—Coding of moving video Versatile supplemental enhancement information messages for coded video bitstreams" Rec. ITU-T Rec. H.274 | ISO/IEC 23002-7, Aug. 2020, 86 pages.
Document: JVET-S2007-v7, Boyce, J., et al., "Versatile supplemental enhancement information messages for coded video bitstreams (Draft 5)," Joint Video Experts Team (JVET) of ITU-T SG 16 WP 3 and ISO/IEC JTC 1/SC 29/WG 11 18th Meeting: by teleconference, Apr. 15-24, 2020, 85 pages.
Document: JVET-R2007-v4, Boyce, J., et al., "Supplemental enhancement information for coded video bitstreams (Draft 4)," Joint Video Experts Team (JVET) of ITU-T SG 16 WP 3 and ISO/IEC JTC 1/SC 29/WG 11 18th Meeting: by teleconference, Apr. 15-24, 2020, 81 pages.
Document: JVET-S0269-v1, Wang, Y., et al., "AHG17/AHG9: SEI manifest and SEI prefix indication SEI messages," Joint Video Experts Team (JVET) of ITU-T SG 16 WP 3 and ISO/IEC JTC 1/SC 29/WG 11 19th Meeting: by teleconference, Jun. 22-Jul. 1, 2020, 1 page.
Foreign Communication From A Related Counterpart Application, PCT Application No. PCT/CN2021/121512, International Search Report dated Dec. 30, 2021, 10 pages.
Foreign Communication From A Related Counterpart Application, PCT Application No. PCT/CN2021/121513, International Search Report dated Dec. 30, 2021, 9 pages.
"Preliminary draft of ISO/IEC FDIS 23008-2:201x (4th edition)," 124. MPEG Meeting; 2Oct. 8, 2018-Oct. 12, 2018; Macao; (Motion Picture Expert Group or ISO/IEC JTC/SC 29/WG11), No. N18095, Jan. 4, 2019, XP030198392, Retrieved from the Internet: URL: http://phenix.int-evry.fr/mpeg/doc_end_user/documents/124_Macao/wg11/w18095.zip w18095_re1imDraftFDIS_23008-2_4thEd-v1.docx [retrieved on Jan. 4, 2019], 872 pages.
Document: JVET-P0462-v1, Skupin, R., et al., "AHG6: 360-degree video related SEI messages," Joint Video Experts Team (JVET) of ITU-T SG 16 WP 3 and ISO/IEC JTC 1/SC 29/WG 11 16th Meeting: Geneva, CH, Oct. 1-11, 2019, 2 pages.
Document: JVET-T0070-v1, Wang, Y.K., et al., "AHG9/AHG8: Scalability dimension SEI message," Joint Video Experts Team (JVET) of ITU-T SG 16 WP 3 and ISO/IEC JTC 1/SC 29/WG 11 20th Meeting: by teleconference, Oct. 7-16, 2020, 3 pages.
Document: JVET-V0063-v1, Wang, Y.K., et al., "AHG9: On the scalability dimension information SEI message," Joint Video Experts Team (JVET) of ITU-T SG 16 WP 3 and ISO/IEC JTC 1/SC 29 22nd Meeting, by teleconference, Apr. 20-28, 2021, 4 pages.
Extended European Search Report from European Application No. 21874494.4 dated Jan. 29, 2024, 11 pages.
Document: JCTVC-O0041 v3, Document: JCT3V-F003lv3, Hannuksela, M., et al., "REXTIMV-HEVCISHVC HLS: auxiliary picture layers," Joint Collaborative Team on Video Coding (JCT-VC) ofTTU-T SG 16 WP 3 and 1SO/TEC . JTC 1/SC 29/WG 11 15th Meeting: Geneva, CH, Oct. 23-Nov. 1, 2013, 10 pages.
Non-Final Office Action from U.S. Appl. No. 18/192,091 dated Aug. 2, 2024, 24 pages.
Japanese Office Action from Japanese Patent Application No. 2023-518729 dated Jun. 25, 2024, 11 pages.
Japanese Office Action from Japanese Patent Application No. 2023-518730 dated Jun. 25, 2024, 10 pages.

* cited by examiner

SIGNALLING OF AUXILIARY INFORMATION

CROSS REFERENCE TO RELATED APPLICATIONS

This application is a continuation of International Patent Application No. PCT/CN2021/121513, filed on Sep. 29, 2021 which claims the priority to and benefit of International Patent Application No. PCT/CN2020/118711, filed on Sep. 29, 2020. All the aforementioned patent applications are hereby incorporated by reference in their entireties.

TECHNICAL FIELD

This patent document relates to digital video coding technologies, including video encoding, transcoding or decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of a video or an image according to a file format.

In one example aspect, a method of processing video data is disclosed. The method includes performing a conversion between a video and a bitstream of the video according to a format rule, wherein the format rule specifies that a supplemental enhancement information field or a video usability information syntax structure included in the bitstream indicates whether the bitstream comprises a multiview bitstream in which multiple views are coded in multiple video layers.

In another example aspect, a method of processing video data is disclosed. The method includes performing a conversion between a video and a bitstream of the video according to a format rule, wherein the format rule specifies that a supplemental enhancement information field included in the bitstream indicates whether the bitstream comprises one or more video layers that represent auxiliary information.

In another example aspect, a video processing method is disclosed. The method includes performing a conversion between a video comprising video pictures and a coded representation of the video, wherein the bitstream conforms to a format rule, wherein the format rule specifies that a field included in the coded representation indicating that the video is a multiview video.

In another example aspect, another video processing method is disclosed. The method includes: performing a conversion between a video comprising video pictures and a coded representation of the video, wherein the bitstream conforms to a format rule, wherein the format rule specifies that a field included in the coded representation indicating that the video is coded in the coded representation int multiple video layers.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

In yet another example aspect, a computer readable medium having a bitstream stored thereon is disclosed. The bitstream is generated or processed using a method described in the present document.

These, and other, features are described throughout the present document.

DETAILED DESCRIPTION

Figure 1:
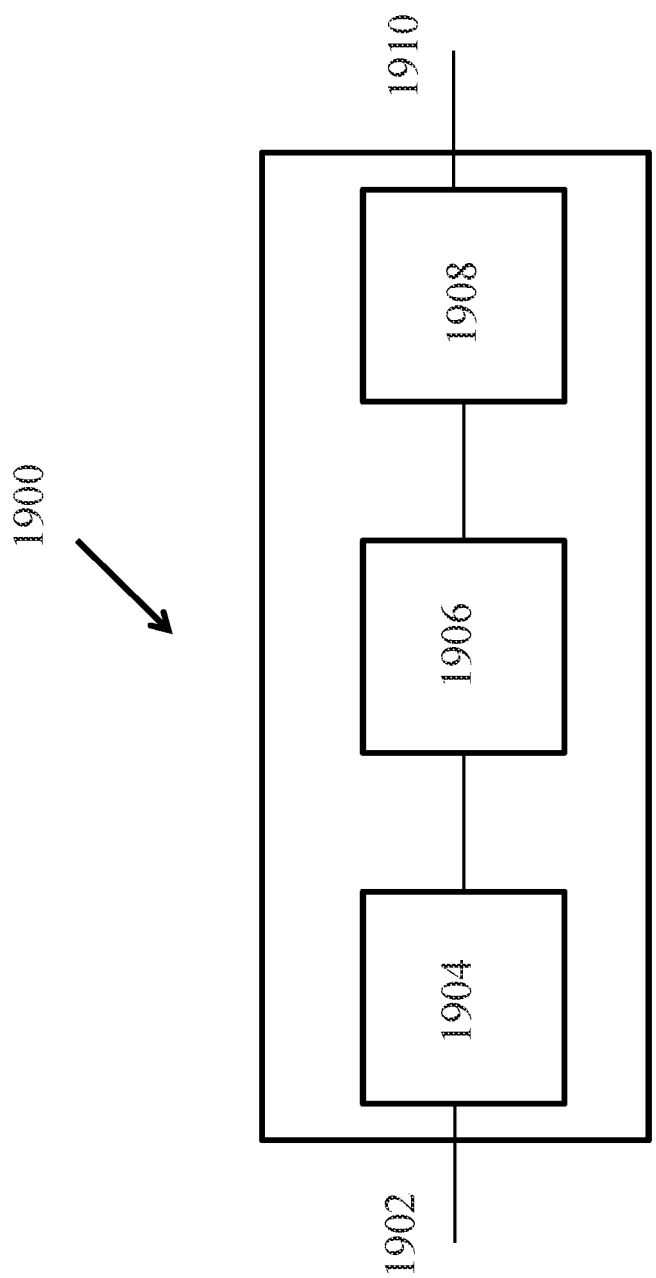
FIG. 1 is a block diagram of an example video processing system.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In the present document, editing changes are shown to text by strikethrough indicating cancelled text and highlight indicating added text (including boldface italic), with respect to the current draft of the VVC specification.

1. Introduction

This document is related to video coding technologies. Specifically, it is related to signalling of scalability dimension information for Versatile Video Coding (VVC) video bitstreams. The ideas may be applied individually or in various combination, to any video coding standard or non-standard video codec, e.g., the recently finalized VVC.

2. Abbreviations

ACT adaptive colour transform
ALF adaptive loop filter
AMVR adaptive motion vector resolution APS adaptation parameter set
AU access unit
AUD access unit delimiter
AVC advanced video coding (Rec. ITU-T H.264|ISO/IEC 14496-10)
B bi-predictive
BCW bi-prediction with CU-level weights
BDOF bi-directional optical flow
BDPCM block-based delta pulse code modulation
BP buffering period
CABAC context-based adaptive binary arithmetic coding
CB coding block
CBR constant bit rate
CCALF cross-component adaptive loop filter
CLVS coded layer video sequence
CLVSS coded layer video sequence start
CPB coded picture buffer
CRA clean random access
CRC cyclic redundancy check
CTB coding tree block
CTU coding tree unit
CU coding unit
CVS coded video sequence
CVSS coded video sequence start
DPB decoded picture buffer
DCI decoding capability information
DRAP dependent random access point
DU decoding unit
DUI decoding unit information
EG exponential-Golomb
EGk k-th order exponential-Golomb
EOB end of bitstream
EOS end of sequence
FD filler data
FIFO first-in, first-out
FL fixed-length
GBR green, blue, and red
GCI general constraints information
GDR gradual decoding refresh
GPM geometric partitioning mode
HEVC high efficiency video coding (Rec. ITU-T H.265|ISO/IEC 23008-2)
HRD hypothetical reference decoder
HSS hypothetical stream scheduler
I intra
IBC intra block copy
IDR instantaneous decoding refresh
ILRP inter-layer reference picture
IRAP intra random access point
LFNST low frequency non-separable transform
LPS least probable symbol
LSB least significant bit
LTRP long-term reference picture
LMCS luma mapping with chroma scaling
MIP matrix-based intra prediction
MPS most probable symbol
MSB most significant bit
MTS multiple transform selection
MVP motion vector prediction
NAL network abstraction layer
OLS output layer set
OP operation point
OPI operating point information
P predictive
PH picture header
POC picture order count
PPS picture parameter set
PROF prediction refinement with optical flow
PT picture timing
PU picture unit
QP quantization parameter
RADL random access decodable leading (picture)
RASL random access skipped leading (picture)
RBSP raw byte sequence payload
RGB red, green, and blue
RPL reference picture list
SAO sample adaptive offset
SAR sample aspect ratio
SEI supplemental enhancement information
SH slice header
SLI subpicture level information
SODB string of data bits
SPS sequence parameter set
STRP short-term reference picture
STSA step-wise temporal sublayer access
TR truncated rice
TU transform unit
VBR variable bit rate
VCL video coding layer
VPS video parameter set
VSEI versatile supplemental enhancement information (Rec. ITU-T H.274|ISO/IEC 23002-7)
VUI video usability information
VVC versatile video coding (Rec. ITU-T H.266|ISO/IEC 23090-3)

3. Initial Discussion 3.1. Video Coding Standards

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM). The JVET was later renamed to be the Joint Video Experts Team (JVET) when the Versatile Video Coding (VVC) project officially started. VVC is the new coding standard, targeting at 50% bitrate reduction as compared to HEVC, that has been finalized by the JVET at its 19th meeting ended at Jul. 1, 2020.

The Versatile Video Coding (VVC) standard (ITU-T H.266|ISO/IEC 23090-3) and the associated Versatile Supplemental Enhancement Information (VSEI) standard (ITU-T H.274|ISO/IEC 23002-7) have been designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 360° immersive media.

3.2. Video Based Point Cloud Compression (V-PCC)

ISO/IEC 23090-5, Information technology—Coded Representation of Immersive Media—Part 5: Visual Volumetric Video-based Coding (V3C) and Video-based Point Cloud Compression (V-PCC), also referred to as V-PCC in short, is a standard that specifies coded representations of point cloud signals. The V-PCC standard is another standard that has been finalized recently.

V-PCC specifies data types like occupancy, geometry, texture attribute, material attribute, transparency attribute, reflectance attribute, and normal attribute that can be coded using a specific video codec such as VVC, HEVC, AVC, etc.

3.3. Temporal Scalability Support in VVC

VVC includes a similar support of temporal scalability as in HEVC. Such support includes the signaling of temporal ID in the NAL unit header, the restriction that pictures of a particular temporal sublayer cannot be used for inter prediction reference by pictures of a lower temporal sublayer, the sub-bitstream extraction process, and the requirement that each sub-bitstream extraction output of an appropriate input must be a conforming bitstream. Media-aware network elements (MANEs) can utilize the temporal ID in the NAL unit header for stream adaptation purposes based on temporal scalability.

3.4. Picture Resolution Change within a Sequence in VVC

In AVC and HEVC, the spatial resolution of pictures cannot change unless a new sequence using a new SPS starts, with an IRAP picture. VVC enables picture resolution change within a sequence at a position without encoding an TRAP picture, which is always intra-coded. This feature is sometimes referred to as reference picture resampling (RPR), as the feature needs resampling of a reference picture used for inter prediction when that reference picture has a different resolution than the current picture being decoded.

In order to allow reusing the motion compensation module of existing implementations, the scaling ratio is restricted to be larger than or equal to ½ (2 times downsampling from the reference picture to the current picture), and less than or equal to 8 (8 times upsampling). The horizontal and vertical scaling ratios are derived based on picture width and height, and the left, right, top and bottom scaling offsets specified for the reference picture and the current picture.

RPR allows resolution change without the need of coding an IRAP picture, which causes a momentary bit rate spike in streaming or video conferencing scenarios, e.g., to cope with network condition changes. RPR also can be used in application scenarios wherein zooming of the entire video region or some region of interest is needed. The scaling window offsets are allowed to be negative to support a wider range of zooming-based applications. Negative scaling window offsets also enable extraction of subpicture sequences out of a multi-layer bitstream while keeping the same scaling window for the extracted sub-bitstream as in the original bitstream.

Differently from the spatial scalability in the scalable extension of HEVC, where picture resampling and motion compensation are applied in two different stages, RPR in VVC is carried out as part of the same process on a block level where the derivation of sample positions and motion vector scaling are performed during motion compensation.

In an effort to limit the implementation complexity, a change of picture resolution within a CLVS is disallowed when the pictures in the CLVS have multiple subpictures per picture. Furthermore, decoder side motion vector refinement, bi-directional optical flow, and prediction refinement with optical flow are not applied when RPR is used between the current picture and the reference pictures. The collocated picture for the derivation of temporal motion vector candidates is also restricted to have the same picture size, scaling window offsets, and CTU size as the current picture.

For support of RPR, some other aspects of the VVC design have been made different from HEVC. First, the picture resolution and the corresponding conformance and scaling windows are signaled in the PPS instead of in the SPS, while in the SPS the maximum picture resolution and corresponding conformance window are signaled. In applications, the maximum picture resolution with the corresponding conformance window offsets in the SPS can be used as intended or desired picture output size after cropping. Second, for a single-layer bitstream, each picture store (a slot in the DPB for storage of one decoded picture) occupies the buffer size as required for storing a decoded picture having the maximum picture resolution.

3.5. Multilayer Scalability Support in VVC

Having the ability to inter-predict from reference pictures of different sizes than the current picture by means of RPR in the VVC core design allows VVC to easily support bitstreams containing multiple layers of different resolutions, e.g., two layers with standard definition and high definition resolutions, respectively. In a VVC decoder, such functionality can be integrated without the need of any additional signal-processing-level coding tool, as the upsampling functionality needed for spatial scalability support can be provided by reusing the RPR upsampling filter. Nevertheless, additional high-level syntax designs to enable the scalability support of a bitstream are needed.

Scalability is supported in VVC but is included only in the multi-layer profiles. Different from the scalability supports in any earlier video coding standards, including extensions of AVC and HEVC, the design of VVC scalability has been made friendly to single-layer decoder implementations as much as possible. The decoding capability for multi-layer bitstreams are specified in a manner as if there was only a single layer in the bitstream. For example, the decoding capability, such as the DPB size, is specified in a manner that is independent of the number of layers in the bitstream to be decoded. Basically, a decoder designed for single-layer bitstreams does not need significant changes to be able to decode multi-layer bitstreams.

Compared to the designs of multi-layer extensions of AVC and HEVC, the HLS aspects have been significantly simplified at the sacrifice of some flexibility. For examples, 1) an IRAP AU is required to contain a picture for each of the layers present in the CVS, which avoids the need of specifying a layer-wise startup decoding process, and 2) a much simpler design for POC signaling, instead of the complicated POC resetting mechanism, is included in VVC, to make sure that the derived POC values are the same for all pictures in an AU.

Like in HEVC, the information about layers and layer dependency is included in the VPS. The information of OLSs is provided for signaling of which layers are included in an OLS, which layers are output, and other information such as PTL and HRD parameters associated with each OLS. Similar to HEVC, there are three modes of operations to output either all layers, only the highest layer, or particular indicated layers in a custom output mode.

There are some differences between the OLS design in VVC and in HEVC. First, in HEVC the layer sets are signaled, then OLSs are signaled based on the layer sets, and for each OLS the output layers are signaled. The design in HEVC allowed a layer to belong to an OLS that was neither an output layer nor a layer required for decoding an output layer. In VVC, the design requires any layer in an OLS to be either an output layer or a layer required for decoding an output layer. Therefore, in VVC OLSs are signaled by indicating the output layers of an OLS and then other layers belonging to an OLS are simply derived by the layer dependencies indicated in the VPS. Furthermore, VVC requires each layer to be included in at least one OLS.

Figure 7:
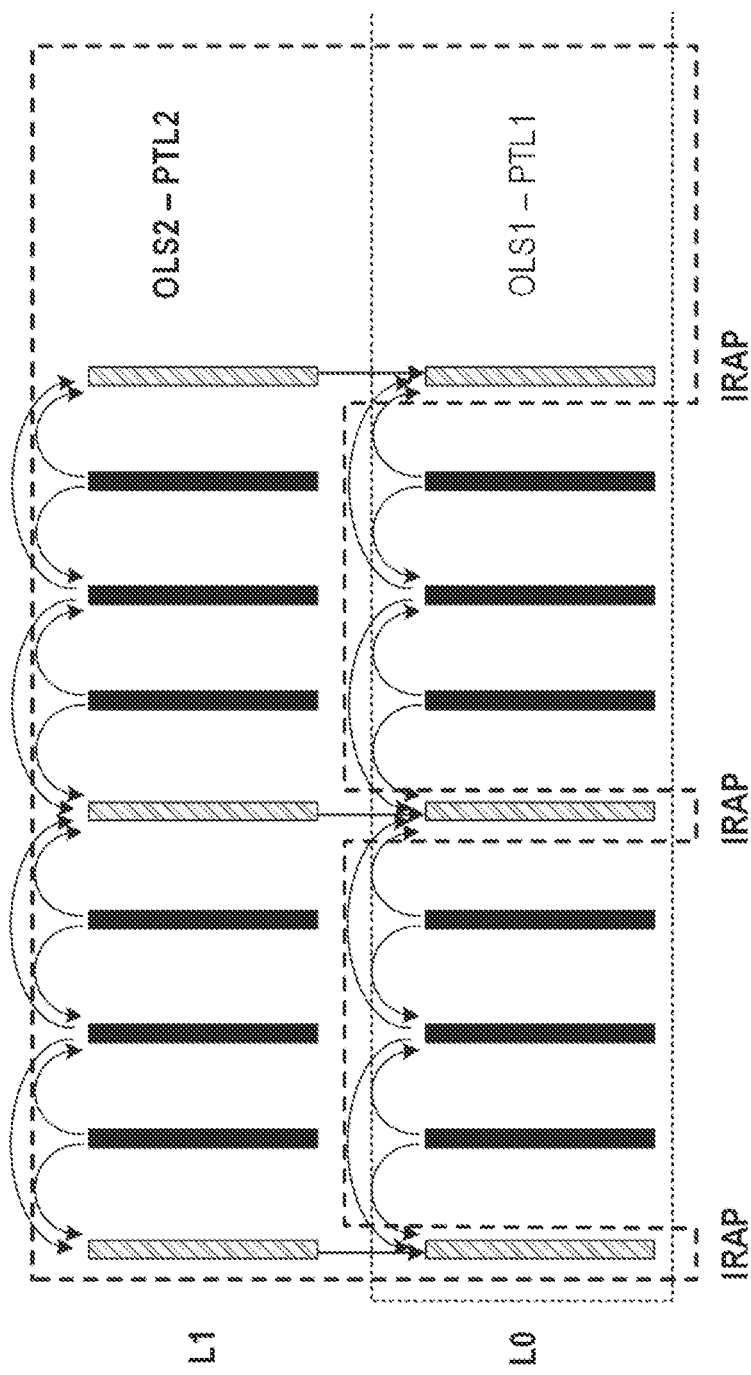
FIG. 7 is an example of a bitstream with two OLSs where OLS2 has vps_max_tid_il_ref_pics_plus1[1][0] equal to 0.

Another difference in the VVC OLS design is that, contrary to HEVC, for which an OLS consists of all NAL units that belong to the set of identified layers mapped to the OLS, VVC may exclude some NAL units that belong to non-output layers mapped to an OLS. More specifically, an OLS for VVC consists of the set of layers that are mapped to the OLS with non-output layers including only IRAP or GDR pictures with ph_recovery_poc_cnt equal to 0 or pictures from the sublayers that are used for inter-layer prediction. This allows indicating an optimal level value for a multi-layer bitstream considering only all the "necessary" pictures of all sublayers within the layers that form the OLS, where "necessary" herein means needed for output or decoding. FIG. 7 shows an example of a two-layer bitstream with vps_max_tid_il_ref_pics_plus1 [1][0] equal to 0, i.e. a sub-bitstream for which only IRAP pictures from layer L0 are kept when OLS2 is extracted.

Taking into account some scenarios for which it is beneficial to allow different RAP periodicity at different layers, similarly as in AVC and HEVC, AUs are allowed to have layers with non-aligned RAPs. For faster identification of RAPs in a multi-layer bitstream, i.e. AUs with a RAP at all layers, the access unit delimiter (AUD) was extended compared to HEVC with a flag indicating whether the AU is an IRAP AU or GDR AU. Furthermore, the AUD is mandated to be present at such IRAP or GDR AUs when the VPS indicates multiple layers. However, for single layer bitstreams as indicated by the VPS or bitstreams not referring to a VPS, the AUD is completely optional as in HEVC because in this case RAPs can be easily detected from the NAL unit type of the first slice in the AU and the respective parameter sets.

To enable sharing of SPSs, PPSs, and APSs by multiple layers and at the same time to make sure that bitstream extraction process does not throw away parameter sets needed by the decoding process, a VCL NAL unit of a first layer can refer to an SPS, PPS, or APS with the same or a lower layer ID value, as long as all OLSs that include the first layer also include the layer identified by the lower layer ID value.

3.6. VUI and SEI Messages

VUI is a syntax structure sent as part of the SPS (and possibly also in VPS in HEVC). VUI carries information that does not affect the normative decoding process, but that can be important for proper rendering of the coded video.

SEI assists in processes related to decoding, display or other purposes. Same as VUI, SEI does not affect the normative decoding process, either. SEI is carried in SEI messages. Decoder support of SEI messages is optional. However, SEI messages do affect bitstream conformance (e.g., if the syntax of an SEI message in a bitstream does not follow the specification, then the bitstream is not conforming) and some SEI messages are needed in the HRD specification.

The VUI syntax structure and most SEI messages used with VVC are not specified in the VVC specification, but rather in the VSEI specification. The SEI messages necessary for HRD conformance testing are specified in the VVC specification. VVC v1 defines five SEI messages relevant for HRD conformance testing and VSEI v1 specifies 20 additional SEI messages. The SEI messages carried in the VSEI specification do not directly impact conforming decoder behavior and have been defined so that they can be used in a coding-format-agnostic manner, allowing VSEI to be used in the future with other video coding standards in addition to VVC. Rather than referring specifically to VVC syntax element names, the VSEI specification refers to variables, whose values are set within the VVC specification.

Compared to HEVC, the VUI syntax structure of VVC focuses only on information relevant for proper rendering of the pictures and does not contain any timing information or bitstream restriction indications. In VVC, the VUI is signaled within the SPS, which includes a length field before the VUI syntax structure to signal the length of the VUI payload in bytes. This makes it possible for a decoder to easily jump over the information, and more importantly, allows convenient future VUI syntax extensions by directly adding new syntax elements to the end of the VUI syntax structure, in a similar manner as SEI message syntax extension.

The VUI syntax structure contains the following information:

The content being interlaced or progressive;

Whether the content contains frame-packed stereoscopic video or projected omnidirectional video;

Sample aspect ratio;

Whether the content is appropriate for overscan display;

Color description, including color primaries, matrix and transfer characteristics, which is particularly important to be able to signal ultra high definition (UHD) vs high definition (HD) color space as well as high dynamic range (HDR);

Chroma location compared to luma (for which the signaling was clarified for progressive content compared to HEVC).

When the SPS does not contain any VUI, the information is considered unspecified and has to be conveyed via external means or specified by the application if the content of the bitstream is intended for rendering on a display.

Table 1 lists all the SEI messages specified for VVC v1, as well as the specification containing their syntax and semantics. Of the 20 SEI messages specified in the VSEI specification, many were inherited from HEVC (for example, the filler payload and both user data SEI messages). Some SEI messages are essential for correct processing or rendering of the coded video content. This is for example the case for the mastering display color volume, the content light level information or the alternative transfer characteristics SEI messages which are particularly relevant for HDR content. Other examples include the equirectangular projection, sphere rotation, region-wise packing or omnidirectional viewport SEI messages, which are relevant for signaling and processing of 360° video content.

TABLE 1

List of SEI messages in VVC v1

| Name of SEI message | Purpose of SEI message |
|---|---|
| SEI messages specified in the VVC specification | |
| Buffering period | Initial CPB removal delays for HRD |
| Picture timing | CPB removal delays and DPB output delays for HRD |
| Decoding unit information | CPB removal delays and DPB output delays for DU based HRD |
| Scalable nesting | Mechanism to associate SEI messages with specific output layer sets, layers or sets of subpictures |
| Subpicture level information | Information about levels for subpicture sequences |
| SEI messages specified in the VSEI specification | |
| Filler payload | Filler data for adjusting the bit rate |
| User data registered by Rec. ITU-T T.35 | Convey user data, can be used as container for data by other organizations |
| User data unregistered | |
| Film grain characteristics | Model for film grain synthesis |
| Frame packing arrangement | Information about how stereoscopic video is coded in the bitstream, e.g., by packing the two pictures for each time instance of the two views into one picture |
| Parameter sets inclusion indication | Indication of whether the sequence contains all the required NAL units for decoding |
| Decoded picture hash | Hash of the decoded pictures for error detection |
| Mastering display color volume | Description of the color volume of a display used to author the content |
| Content light level information | Upper bounds for the nominal target brightness light level of the content |
| Dependent RAP indication | Indicates a picture using only the preceding IRAP picture for inter prediction referencing |
| Alternative transfer characteristics | Preferred alternative value for the transfer characteristics of the content |
| Ambient viewing environment | Characteristics of the nominal ambient viewing environment for the display of the content, can be used to assist the receiver in processing content depending on the local viewing environment |
| Content color volume | Color volume characteristics of the associated picture |
| Equirectangular projection | Indication of the projection format applied, including information needed for remapping of the content onto a sphere for rendering in omnidirectional video applications |
| Generalized cubemap projection | |
| Sphere rotation | Information on rotation angles for conversion between the global and local coordinate axes, for use in omnidirectional video applications |
| Region-wise packing | Information needed for remapping of the cropped decoded pictures, involving region-wise operations like repositioning, resizing and rotation, onto projected pictures, for use in omnidirectional video applications |
| Omnidirectional viewport | Coordinates of one or more regions corresponding to viewports recommended for display, for use in omnidirectional video applications |
| Frame-field information | Indicates how the associated picture should be displayed, its source scan, and whether it is a duplicate of a previous picture |
| Sample aspect ratio information | Information about sample aspect ratio of the associated picture |

New SEI messages that were specified for VVC v1 include the frame-field information SEI message, the sample aspect ratio information SEI message, and the subpicture level information SEI message.

The frame-field information SEI message contains information to indicate how the associated picture should be displayed (such as field parity or frame repetition period), the source scan type of the associated picture and whether the associated picture is a duplicate of a previous picture. This information used to be signaled in the picture timing SEI message in previous video coding standards, together with the timing information of the associated picture. However, it was observed that the frame-field information and timing information are two different kinds of information that are not necessarily signaled together. A typical example consists in signaling the timing information at the systems level, but signaling the frame-field information within the bitstream. It was therefore decided to remove the frame-field information from the picture timing SEI message and signal it within a dedicated SEI message instead. This change also made it possible to modify the syntax of the frame-field information to convey additional and clearer instructions to the display, such as the pairing of fields together, or more values for frame repetition.

The sample-aspect ratio SEI message enables signaling different sample aspect ratios for different pictures within the same sequence, whereas the corresponding information contained in the VUI applies to the whole sequence. It may be relevant when using the reference picture resampling feature with scaling factors that cause different pictures of the same sequence to have different sample aspect ratios.

The subpicture level information SEI message provides information of levels for the subpicture sequences.

4. Technical Problems Solved by Disclosed Technical Solution

VVC supports multi-layer scalabilities. However, given a VVC multi-layer bitstream, it is unknown whether the bitstream of an OLS is a multiview bitstream or just a bitstream consisting of multiple layers with SNR and/or spatial scalabilities. Furthermore, given a VVC multi-layer bitstream, it is unknown whether there is one or layers representing auxiliary information such as alpha, depth, etc., and if yes, which layers represent what.

5. A Listing of Technical Solutions

To solve the above problems, methods as summarized below are disclosed. The inventions should be considered as examples to explain the general concepts and should not be interpreted in a narrow way. Furthermore, these inventions can be applied individually or combined in any manner.

1) Information indicating whether a VVC video bitstream is a multiview bitstream is signalled in the VVC video bitstream.
   a. In one example, the information is signalled in an SEI message, e.g., named scalability dimension SEI message.
      i. In one example, the scalability dimension SEI message provides the information for the bitstream bitstreamInScope, which is defined as the sequence of AUs that consists, in decoding order, of the AU containing the current scalability dimension SEI message, followed by zero or more AUs, including all subsequent AUs up to but not including any subsequent AU that contains a scalability dimension SEI message.
      ii. In one example, the SEI message includes a flag that indicates whether the bitstream may be a multiview bitstream.
      iii. In one example, the SEI message indicates the view ID of each layer.
         1. In one example, the SEI message includes a flag that indicates whether the view ID is signalled for each layer.
         2. In one example, the length, in bits, of the view ID for each layer, is signalled in the SEI message.
   b. In one example, the information is signalled as part of the VUI.
2) Information indicating whether a VVC video bitstream includes one or more layer representing auxiliary information is signalled in the VVC video bitstream.
   a. In one example, the information is signalled in an SEI message, e.g., named scalability dimension SEI message.
      i. In one example, the scalability dimension SEI message provides the information for the bitstream bitstreamInScope, which is defined as the sequence of AUs that consists, in decoding order, of the AU containing the current scalability dimension SEI message, followed by zero or more AUs, including all subsequent AUs up to but not including any subsequent AU that contains a scalability dimension SEI message.
      ii. In one example, the SEI message includes a flag that indicates whether the bitstream may contain auxillary information carried by one or more layers.
      iii. In one example, the SEI message indicates an auxiliary ID of each layer.
         1. In one example, the SEI message includes a flag that indicates whether the auxiliary ID is signalled for each layer.
         2. In one example, a value of the auxiliary ID, e.g., 0, indicates that the layer does not contain auxillary pictures.
         3. In one example, a value of the auxiliary ID, e.g., 1, indicates that the type of auxiliary information is alpha.
         4. In one example, a value of the auxiliary ID, e.g., 2, indicates that the type of auxiliary information is depth.
         5. In one example, a value of the auxiliary ID, e.g., 3, indicates that the type of auxiliary information is occupancy, e.g., as specified in V-PCC.
         6. In one example, a value of the auxiliary ID, e.g., 4, indicates that the type of auxiliary information is geometry, e.g., as specified in V-PCC.
         7. In one example, a value of the auxiliary ID, e.g., 5, indicates that the type of auxiliary information is attribute, e.g., as specified in V-PCC.
         8. In one example, a value of the auxiliary ID, e.g., 6, indicates that the type of auxiliary information is the texture attribute, e.g., as specified in V-PCC.
         9. In one example, a value of the auxiliary ID, e.g., 7, indicates that the type of auxiliary information is the material attribute, e.g., as specified in V-PCC.
         10. In one example, a value of the auxiliary ID, e.g., 8, indicates that the type of auxiliary information is the transparency attribute, e.g., as specified in V-PCC.
         11. In one example, a value of the auxiliary ID, e.g., 9, indicates that the type of auxiliary information is the reflectance attribute, e.g., as specified in V-PCC.
         12. In one example, a value of the auxiliary ID, e.g., 10, indicates that the type of auxiliary information is the normal attribute, e.g., as specified in V-PCC.
   b. In one example, the information is signalled as part of the VUI.

6. EMBODIMENTS

Below are some example embodiments for some of the invention aspects summarized above in Section 5, which can be applied to the WC specification and VSEI specification.

6.1. First Embodiment

This embodiment is for items 1, 1.a and all its subitems, 2, 2.a, 2.a.i, 2.a.ii, 2.a.iii, 2.a.iii.1, 2.a.iii.2, 2.a.iii.3, and 2.a.iii.4.

6.1.1. Scalability Dimension SEI Message Syntax

| scalability_dimension( payloadSize ) { | Descriptor |
|---|---|
| sd_max_layers_minus1 | u(6) |
| sd_multiview_info_flag | u(1) |
| sd_auxilary_info_flag | u(1) |
| if( sd_multiview_info_flag \|\| sd_auxilary_info_flag ) { | |
|   if( sd_multiview_info_flag ) | |
|     sd_view_id_len | u(4) |
|   for( i = 0; i <= vps_max_layers_minus1; i++ ) { | |
|     if( sd_multiview_info_flag ) | |
|       sd_view_id_val[ i ] | u(v) |
|     if( sd_auxilary_info_flag ) | |
|       sd_aux_id[ i ] | u(8) |
|   } | |
| } | |
| } | |

6.1.2. Scalability Dimension SEI Message Semantics

The scalability dimension SEI message provides the scalability dimension information for each layer in bitstreamInScope (defined below), such as 1) when bitstreamInScope may be a multiview bitstream, the view ID of each layer; and 2) when there may be auxillary information (such as depth or alpha) carried by one or more layers in bitstreamInScope, the auxillary ID of each layer. The bitstreamInScope is the sequence of AUs that consists, in decoding order, of the AU containing the current scalability dimension SEI message, followed by zero or more AUs, including all subsequent AUs up to but not including any subsequent AU that contains a scalability dimension SEI message.

sd_max_layers_minus1 plus 1 indicates the maximum number of layers in bitstreamInScope.

sd_multiview_info_flag equal to 1 indicates that bitstreamInScope may be a multiview bitstream and the sd_view_id_val[ ] syntax elements are present in the scalability dimension SEI message.

sd_multiview_flag equal to 0 indicates that bitstreamInScope is not a multiview bitstream and the sd_view_id_val[ ] syntax elements are not present in the scalability dimension SEI message.

sd_auxilary_info_flag equal to 1 indicates that there may be auxillary information carried by one or more layers in bitstreamInScope and the sd_aux_id[ ] syntax elements are present in the scalability dimension SEI message. sd_auxilary_info_flag equal to 0 indicates that there is no auxillary information carried by one or more layers in bitstreamInScope and the sd_aux_id[ ] syntax elements are not present in the scalability dimension SEI message.

sd_view_id_len specifies the length, in bits, of the sd_view_id_val[i] syntax element.

sd_view_id_val[i] specifies the view ID of the i-th layer in bitstreamInScope. The length of the sd_view_id_val[i] syntax element is sd_view_id_len bits. When not present, the value of sd_view_id_val[i] is inferred to be equal to 0.

sd_aux_id[i] equal to 0 indicates that the i-th layer in bitstreamInScope does not contain auxillary pictures. sd_aux_id[i] greater than 0 indicates the type of auxiliary pictures in the i-th layer in bitstreamInScope as specified in Table Table 2.

TABLE 2

Mapping of sd_aux_id[ i ] to the type of auxiliary pictures

| sd_aux_id [ i ] | Name | Type of auxiliary pictures |
|---|---|---|
| 1 | AUX_ALPHA | Alpha plane |
| 2 | AUX_DEPTH | Depth picture |
| 3 . . . 127 | | Reserved |
| 128 . . . 159 | | Unspecified |
| 160 . . . 255 | | Reserved |

NOTE 1—The interpretation of auxiliary pictures associated with sd_aux_id in the range of 128 to 159, inclusive, is specified through means other than the sd_aux_id value.

sd_aux_id[i] shall be in the range of 0 to 2, inclusive, or 128 to 159, inclusive, for bitstreams conforming to this version of this Specification. Although the value of sd_aux_id[i] shall be in the range of 0 to 2, inclusive, or 128 to 159, inclusive, in this version of this Specification, decoders shall allow values of sd_aux_id[i] in the range of 0 to 255, inclusive.

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 2:
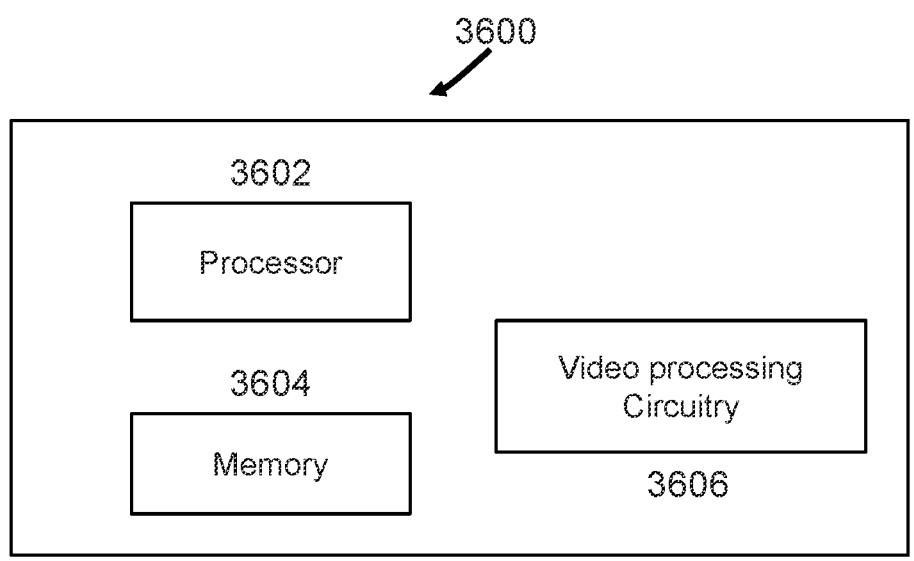
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document. In some embodiments, the video processing hardware 3606 may be at least partly included in the processor 3602, e.g., a graphics co-processor.

Figure 4:
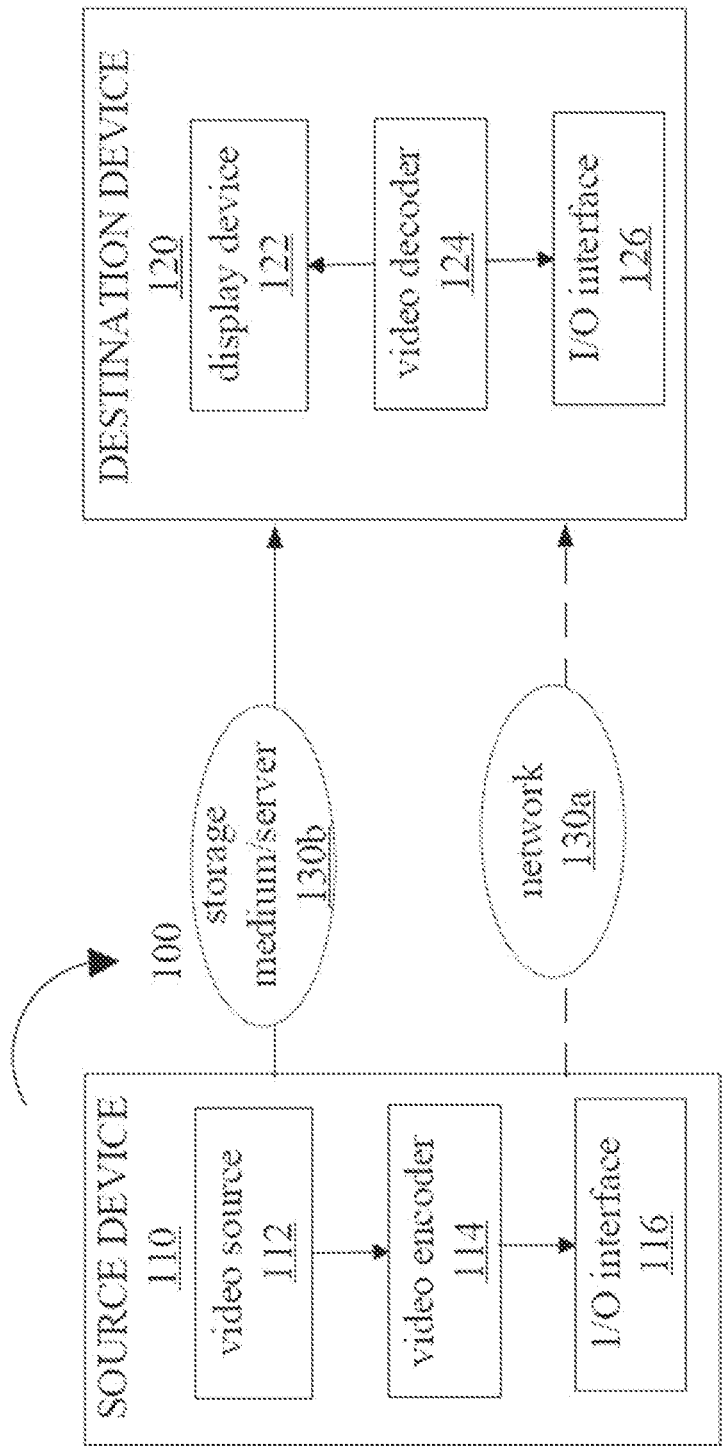
FIG. 4 is a block diagram that illustrates a video coding system in accordance with some embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 5:
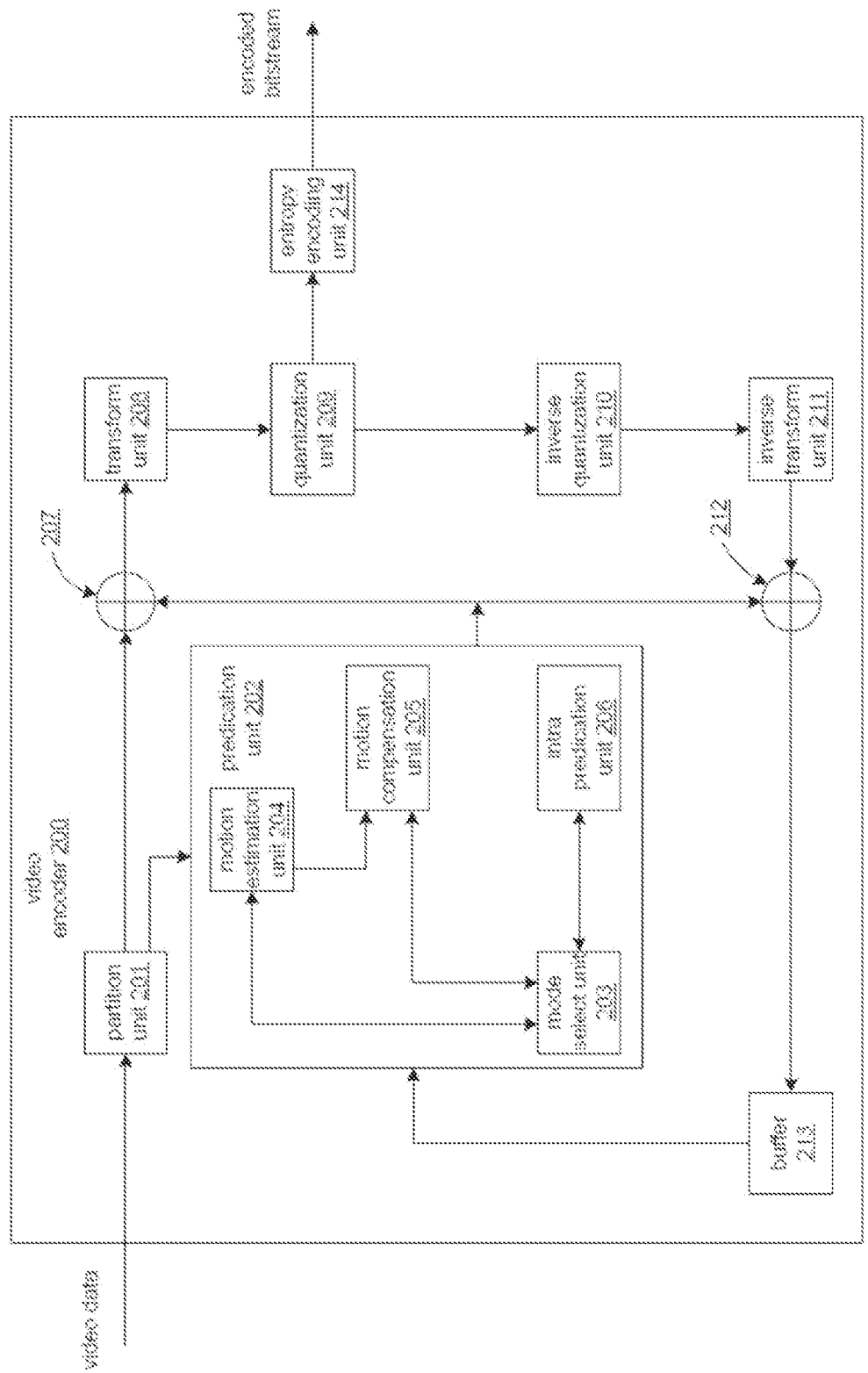
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
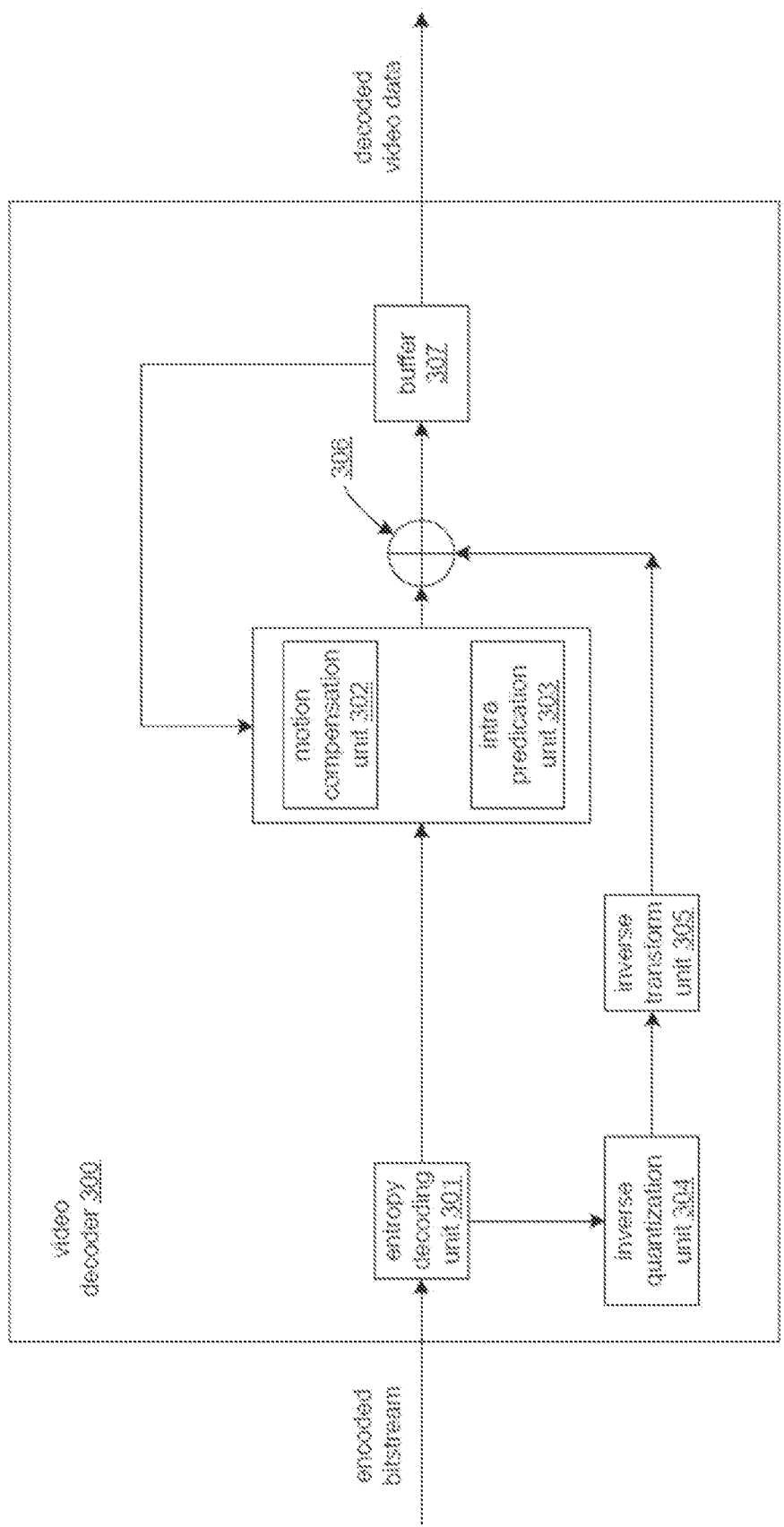
FIG. 6 is a block diagram that illustrates a decoder in accordance with some embodiments of the present disclosure.

FIG. 6 is a block diagram illustrating an example of video decoder 300 which may be video decoder 114 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

The following solutions show example embodiments of techniques discussed in the previous section (e.g., item 1).

Figure 3:
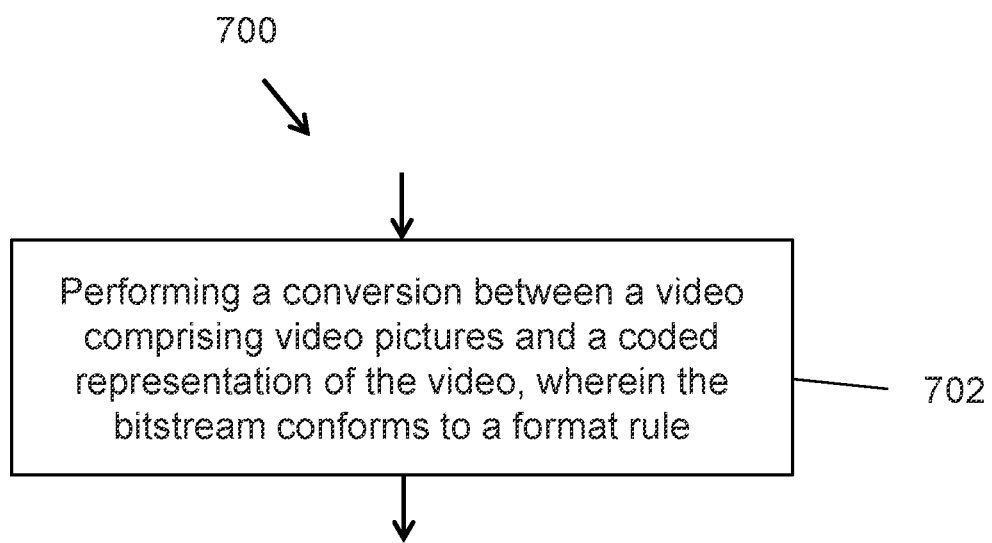
FIG. 3 is a flowchart for an example method of video processing.

1. A method of video processing (e.g., method 700 depicted in FIG. 3), comprising performing (702) a conversion between a video comprising video pictures and a coded representation of the video, wherein the bitstream conforms to a format rule, wherein the format rule specifies that a field included in the coded representation indicating that the video is a multiview video.
2. The method of solution 1, wherein the field is included in a supplemental enhancement information portion of the coded representation.
3. The method of solution 1, wherein the field is included in a video usability information portion of the coded representation.

The following solutions show example embodiments of techniques discussed in the previous section (e.g., item 2).

4. A method of video processing, comprising: performing a conversion between a video comprising video pictures and a coded representation of the video, wherein the bitstream conforms to a format rule, wherein the format rule specifies that a field included in the coded representation indicating that the video is coded in the coded representation int multiple video layers.
5. The method of solution 4, wherein the field is included in a supplemental enhancement information portion of the coded representation.
6. The method of solution 4, wherein the field is included in a video usability information portion of the coded representation.
7. The method of any of solutions 1-6, wherein the conversion comprises generating a coded representation from the video.
8. The method of any of solutions 1-6, wherein the conversion comprises decoding the coded representation to generate the video.
9. A video decoding apparatus comprising a processor configured to implement a method recited in one or more of solutions 1 to 8.
10. A video encoding apparatus comprising a processor configured to implement a method recited in one or more of solutions 1 to 8.
11. A computer program product having computer code stored thereon, the code, when executed by a processor, causes the processor to implement a method recited in any of solutions 1 to 8.
12. A computer readable medium that stores a coded representation generated according to any of solutions 1 to 8.
13. A method, apparatus or system described in the present document.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

Figure 8:
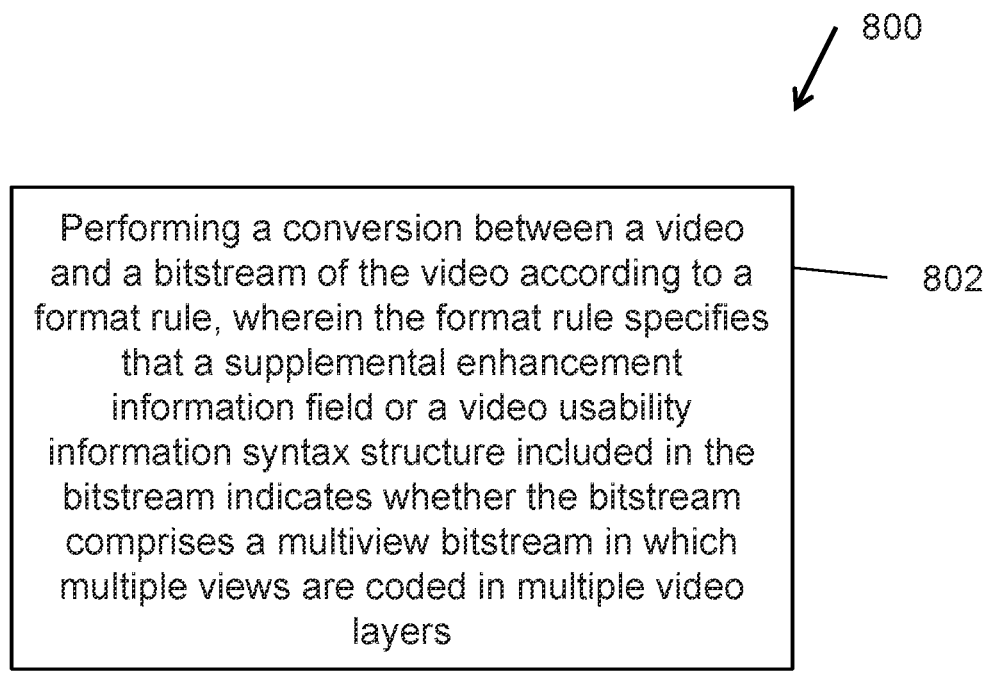
FIGS. 8 to 9 are flowcharts for example methods of video processing.

FIG. 8 is a flowchart for an example method of video processing. Operation 802 includes performing a conversion between a video and a bitstream of the video according to a format rule, wherein the format rule specifies that a supplemental enhancement information field or a video usability information syntax structure included in the bitstream indicates whether the bitstream comprises a multiview bitstream in which multiple views are coded in multiple video layers.

In some embodiments, the format rule specifies that the supplemental enhancement information field is included in a scalability dimension information in a supplemental enhancement information message in the bitstream. In some embodiments, the format rule specifies that the supplemental enhancement information message includes a first flag that indicates whether the bitstream is a multiview bitstream. In some embodiments, the format rule specifies that the supplemental enhancement information message includes a view identifier of each video layer of a plurality of video layers of the bitstream. In some embodiments, the format rule specifies that the supplemental enhancement information message includes a length in bits of the view identifier of each video layer.

In some embodiments, the format rule specifies that the supplemental enhancement information message includes a second flag that indicates whether the view identifier is included in the bitstream for each video layer. In some embodiments, the format rule specifies that the scalability dimension information in the supplemental enhancement information message provides information related to a sequence of access units that include, in a decoding order, an access unit comprising a second scalability dimension information in a second supplemental enhancement information message, followed by zero or more access units, including all subsequent access units up to but not including any subsequent access unit that includes a third scalability dimension information in a third supplemental enhancement information message. In some embodiments, the format rule specifies that the supplemental enhancement information field is included in the video usability information syntax structure in the bitstream. In some embodiments, the bitstream is a versatile video coding bitstream. In some embodiments, the performing the conversion comprising encoding the video into the bitstream. In some embodiments, the performing the conversion comprises generating the bitstream from the video, and the method further comprises storing the bitstream in a non-transitory computer-readable recording medium. In some embodiments, the performing the conversion comprises decoding the video from the bitstream.

Figure 9:
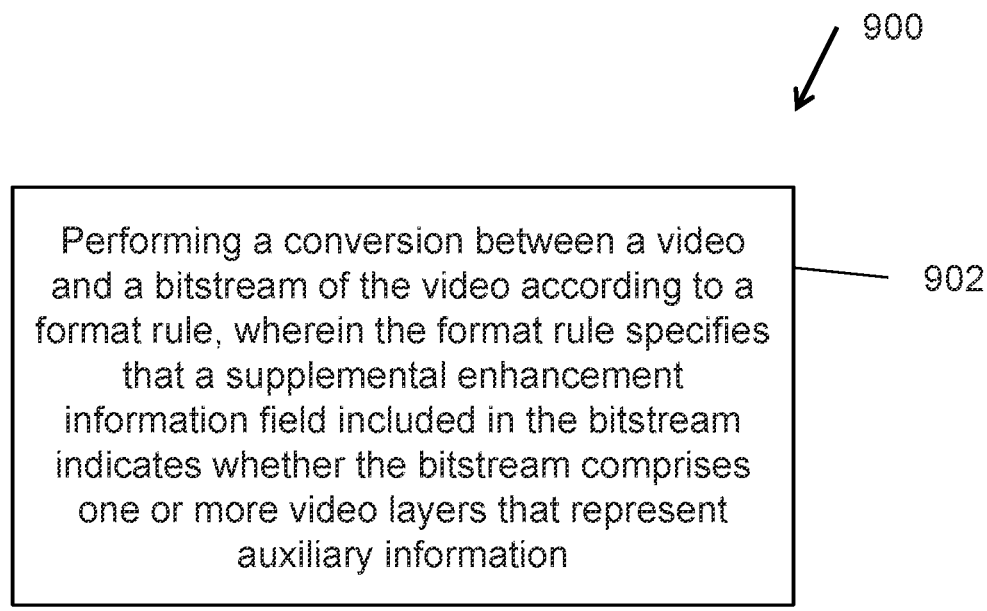

FIG. 9 is a flowchart for an example method of video processing. Operation 902 includes performing a conversion between a video and a bitstream of the video according to a format rule, wherein the format rule specifies that a supplemental enhancement information field included in the bitstream indicates whether the bitstream comprises one or more video layers that represent auxiliary information.

In some embodiments, the format rule specifies that the supplemental enhancement information field is included in a scalability dimension information in a supplemental enhancement information message in the bitstream. In some embodiments, the format rule specifies that the supplemental enhancement information message includes a first flag that indicates whether the bitstream includes the auxiliary information for the one or more video layers. In some embodiments, the format rule specifies that the supplemental enhancement information message includes an auxiliary identifier of each video layer of a plurality of video layers of the bitstream. In some embodiments, the format rule specifies that a first value of an auxiliary identifier of a video layer indicates that the video layer does not include auxiliary pictures.

In some embodiments, the format rule specifies that a second value of an auxiliary identifier of a video layer indicates that a type of an auxiliary information of the video layer is alpha. In some embodiments, the format rule specifies that a third value of an auxiliary identifier of a video layer indicates that a type of an auxiliary information of the video layer is depth. In some embodiments, the format rule specifies that the supplemental enhancement information message includes a second flag that indicates whether the auxiliary identifier is included in the bitstream for each video layer. In some embodiments, the format rule specifies that a fourth value of an auxiliary identifier of a video layer indicates that a type of an auxiliary information of the video layer is occupancy.

In some embodiments, the format rule specifies that a third value of an auxiliary identifier of a video layer indicates that a type of an auxiliary information of the video layer is geometry. In some embodiments, the format rule specifies that a third value of an auxiliary identifier of a video layer indicates that a type of an auxiliary information of the video layer is attribute. In some embodiments, the format rule specifies that a third value of an auxiliary identifier of a video layer indicates that a type of an auxiliary information of the video layer is texture attribute. In some embodiments, the format rule specifies that a third value of an auxiliary identifier of a video layer indicates that a type of an auxiliary information of the video layer is material attribute. In some embodiments, the format rule specifies that a third value of an auxiliary identifier of a video layer indicates that a type of an auxiliary information of the video layer is transparency attribute.

In some embodiments, the format rule specifies that a third value of an auxiliary identifier of a video layer indicates that a type of an auxiliary information of the video layer is reflectance attribute. In some embodiments, the format rule specifies that a third value of an auxiliary identifier of a video layer indicates that a type of an auxiliary information of the video layer is normal attribute. In some embodiments, the format rule specifies that the scalability dimension information in the supplemental enhancement information message provides information related to a sequence of access units that include, in a decoding order, an access unit comprising a second scalability dimension information in a second supplemental enhancement information message, followed by zero or more access units, including all subsequent access units up to but not including any subsequent access unit that includes a third scalability dimension information in a third supplemental enhancement information message.

In some embodiments, the format rule specifies that the supplemental enhancement information field is included in a video usability information in the bitstream. In some embodiments, the video is a versatile video coding video. In some embodiments, the performing the conversion comprising encoding the video into the bitstream. In some embodiments, the performing the conversion comprises generating the bitstream from the video, and the method further comprises storing the bitstream in a non-transitory computer-readable recording medium. In some embodiments, the performing the conversion comprises decoding the video from the bitstream.

In some embodiments, a video decoding apparatus comprising a processor configured to implement a method recited in one or more of the techniques described in this patent document. In some embodiments, a video encoding apparatus comprising a processor configured to implement a method recited in one or more of the techniques described in this patent document. In some embodiments, a computer program product having computer instructions stored thereon, the instructions, when executed by a processor, causes the processor to implement a technique described in this patent document. In some embodiments, a non-transitory computer-readable storage medium that stores a bitstream generated according to the method in any one of the techniques described in this patent document.

In some embodiments, a non-transitory computer-readable storage medium storing instructions that cause a processor to implement a method recited in any of the techniques described in this patent document. In some embodiments, a method of bitstream generation, comprising: generating a bitstream of a video according to a method recited in any of the techniques described in this patent document, and storing the bitstream on a computer-readable program medium. In some embodiments, a method, an apparatus, a bitstream generated according to a disclosed method or a system described in the present document.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
performing a conversion between a video and a bitstream of the video according to a format rule,
wherein the format rule specifies that a supplemental enhancement information field included in the bitstream indicates whether the bitstream is allowed to comprise one or more video layers that represent auxiliary information; and
wherein the format rule further specifies that the supplemental enhancement information field is included in a scalability dimension information in a supplemental enhancement information message in the bitstream.

2. The method of claim 1, wherein the format rule specifies that the supplemental enhancement information message includes an auxiliary identifier of each video layer of one or more video layers of the bitstream.

3. The method of claim 2, wherein the format rule specifies that a first value of an auxiliary identifier of a video layer indicates that the video layer does not include auxiliary pictures.

4. The method of claim 3, wherein the first value is equal to 0.

5. The method of claim 2, wherein the format rule specifies that a second value of an auxiliary identifier of a video layer indicates that a type of auxiliary pictures of the video layer is alpha plane.

6. The method of claim 5, wherein the second value is equal to 1.

7. The method of claim 2, wherein the format rule specifies that a third value of an auxiliary identifier of a video layer indicates that a type of auxiliary pictures of the video layer is depth picture.

8. The method of claim 7, wherein the third value is equal to 2.

9. The method of claim 1, wherein the video is a versatile video coding video.

10. The method of claim 1, wherein the performing the conversion comprises encoding the video into the bitstream.

11. The method of claim 1, wherein the performing the conversion comprises decoding the video from the bitstream.

12. An apparatus for processing video data comprising a processor and a non-transitory memory with instructions thereon, wherein the instructions upon execution by the processor, cause the processor to:
perform a conversion between a video and a bitstream of the video according to a format rule,
wherein the format rule specifies that a supplemental enhancement information field included in the bitstream indicates whether the bitstream is allowed to comprise one or more video layers that represent auxiliary information; and
wherein the format rule further specifies that the supplemental enhancement information field is included in a scalability dimension information in a supplemental enhancement information message in the bitstream.

13. The apparatus of claim 12,
wherein the format rule specifies that the supplemental enhancement information message includes an auxiliary identifier of each video layer of one or more video layers of the bitstream.

14. The apparatus of claim 13, wherein the format rule specifies that a first value of an auxiliary identifier of a video layer indicates that the video layer does not include auxiliary pictures, wherein the first value is equal to 0,
wherein the format rule specifies that a second value of an auxiliary identifier of a video layer indicates that a type of auxiliary pictures of the video layer is alpha plane, wherein the second value is equal to 1, and
wherein the format rule specifies that a third value of an auxiliary identifier of a video layer indicates that a type of auxiliary pictures of the video layer is depth picture, wherein the third value is equal to 2.

15. The apparatus of claim 12, wherein the video is a versatile video coding video.

16. A non-transitory computer-readable storage medium storing instructions that cause a processor to:
perform a conversion between a video and a bitstream of the video according to a format rule,
wherein the format rule specifies that a supplemental enhancement information field included in the bitstream indicates whether the bitstream is allowed to comprise one or more video layers that represent auxiliary information; and
wherein the format rule further specifies that the supplemental enhancement information field is included in a scalability dimension information in a supplemental enhancement information message in the bitstream.

17. The non-transitory computer-readable storage medium of claim 16,
wherein the format rule specifies that the supplemental enhancement information message includes an auxiliary identifier of each video layer of one or more video layers of the bitstream,
wherein the format rule specifies that a first value of an auxiliary identifier of a video layer indicates that the video layer does not include auxiliary pictures, wherein the first value is equal to 0,
wherein the format rule specifies that a second value of an auxiliary identifier of a video layer indicates that a type of auxiliary pictures of the video layer is alpha plane, wherein the second value is equal to 1,
wherein the format rule specifies that a third value of an auxiliary identifier of a video layer indicates that a type of auxiliary pictures of the video layer is depth picture, wherein the third value is equal to 2, and
wherein the video is a versatile video coding video.

18. A non-transitory computer-readable recording medium storing a bitstream of a video which is generated by a method performed by a video processing apparatus, wherein the method comprises:
generating the bitstream of the video according to a format rule,
wherein the format rule specifies that a supplemental enhancement information field included in the bitstream indicates whether the bitstream is allowed to comprise one or more video layers that represent auxiliary information; and
wherein the format rule further specifies that the supplemental enhancement information field is included in a scalability dimension information in a supplemental enhancement information message in the bitstream.

19. The non-transitory computer-readable recording medium of claim 18,
wherein the format rule specifies that the supplemental enhancement information message includes an auxiliary identifier of each video layer of one or more video layers of the bitstream, wherein the format rule specifies that a first value of an auxiliary identifier of a video layer indicates that the video layer does not include auxiliary pictures, wherein the first value is equal to 0,
wherein the format rule specifies that a second value of an auxiliary identifier of a video layer indicates that a type of auxiliary pictures of the video layer is alpha plane, wherein the second value is equal to 1,
wherein the format rule specifies that a third value of an auxiliary identifier of a video layer indicates that a type of auxiliary pictures of the video layer is depth picture, wherein the third value is equal to 2, and
wherein the video is a versatile video coding video.

* * * * *